United States Patent [19]

Waschow

[11] Patent Number: 4,523,576
[45] Date of Patent: Jun. 18, 1985

[54] SOLAR HEATING APPARATUS WITH SOLAR HEAT RECEIVING MEANS AND HEAT STORAGE AND DISTRIBUTION MEANS

[76] Inventor: Dale T. Waschow, Rte. 2, Box 79 B, Eagle, Wis. 53119

[21] Appl. No.: 529,340

[22] Filed: Sep. 6, 1983

[51] Int. Cl.³ .............................................. F24J 3/02
[52] U.S. Cl. .................................. 126/422; 126/430; 126/436; 126/448
[58] Field of Search ............... 126/422, 430, 436, 442, 126/419, 438, 448, 435

[56] References Cited

U.S. PATENT DOCUMENTS

| | | | |
|---|---|---|---|
| 4,061,129 | 12/1977 | Wilson | 126/436 |
| 4,066,118 | 1/1978 | Goetti | 126/435 |
| 4,098,260 | 7/1978 | Goetti | 126/422 |
| 4,209,007 | 6/1980 | collins | 126/422 |
| 4,262,653 | 4/1981 | Holland | 126/436 |
| 4,327,705 | 5/1982 | Stentermann | 126/419 |

Primary Examiner—Samuel Scott
Assistant Examiner—G. Anderson
Attorney, Agent, or Firm—Michael, Best & Friedrich

[57] ABSTRACT

A solar heating apparatus including a solar collector for the heating of air passing therethrough, a heat storage and distribution device, in communication with air from the solar collector, for storing and distributing the heated air to heat a room, and a fan and thermostat for circulating air through the heat storage and distribution device when the air from the solar collector exceeds a predetermined temperature.

The solar collector comprises a plurality of spaced-apart solar heating tubes, an air inlet into the solar collector, an air outlet out of the solar collector, and valves between each of the tubes and the solar collector outlet for selectively placing each of the solar heating tubes in communication with the solar collector outlet when the air temperature in the respective solar heating tube is greater than a predetermined temperature.

The heat storage and distribution device includes a heat storage container, a heat storage medium in the container, and a first air path through the heat storage container for allowing heated air from the solar collector to flow in contact with and heat the medium. The first air path includes an inlet into the container, the inlet being in communication with heated air from the solar collector outlet, and a return outlet in the container and in communication with the solar heating means air inlet.

12 Claims, 8 Drawing Figures

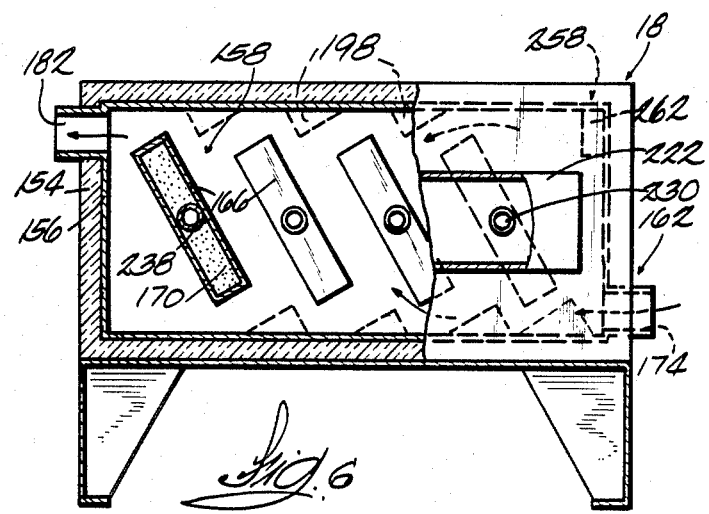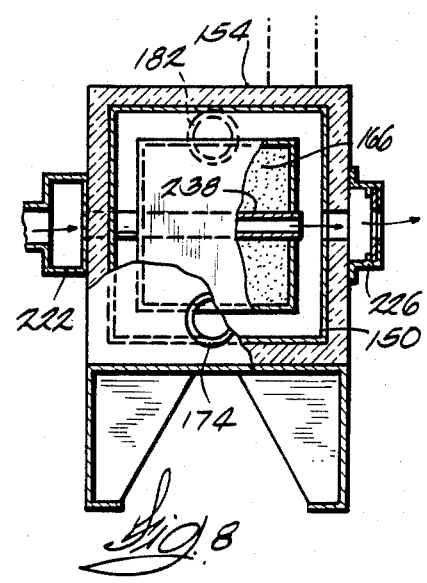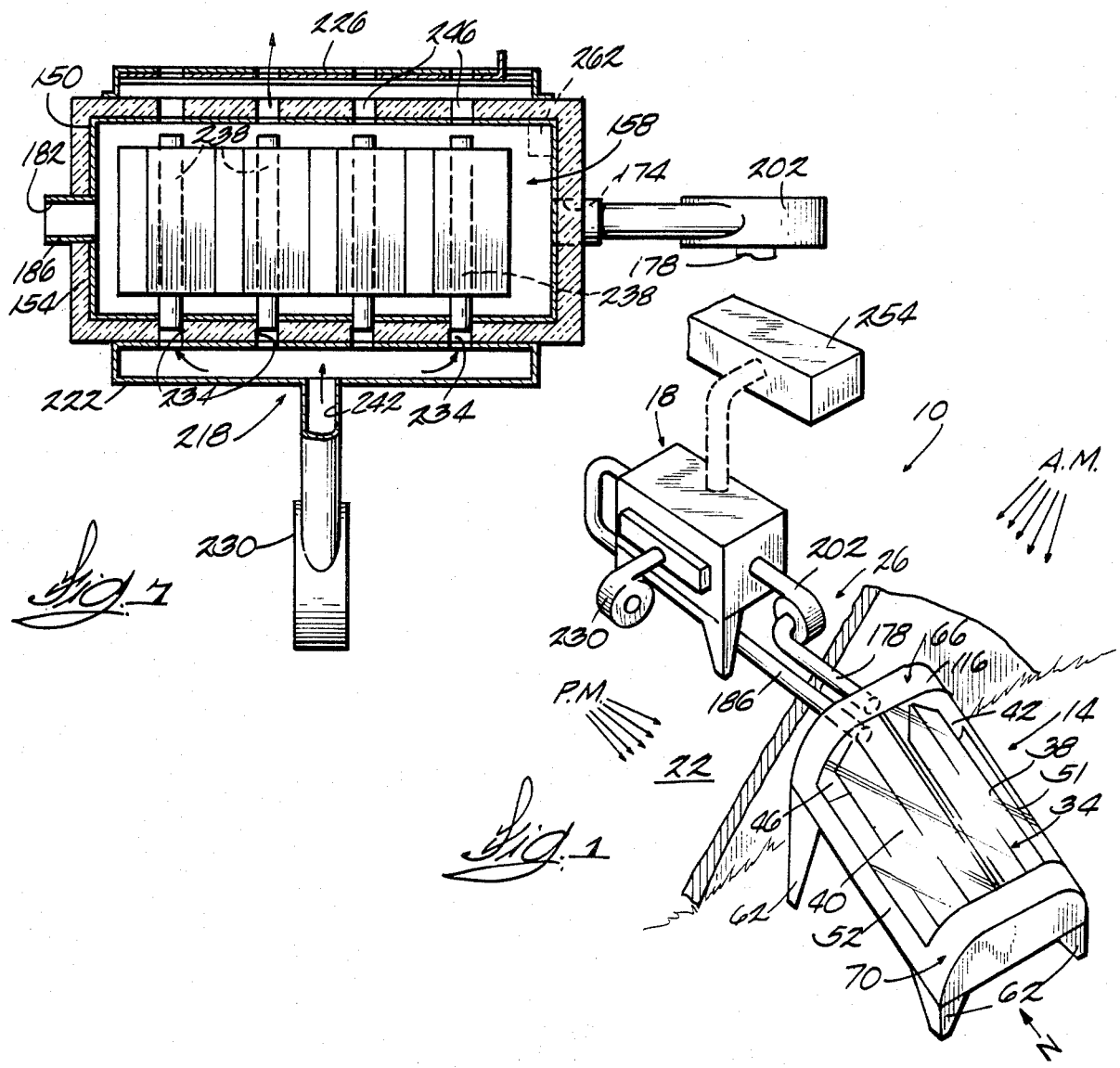

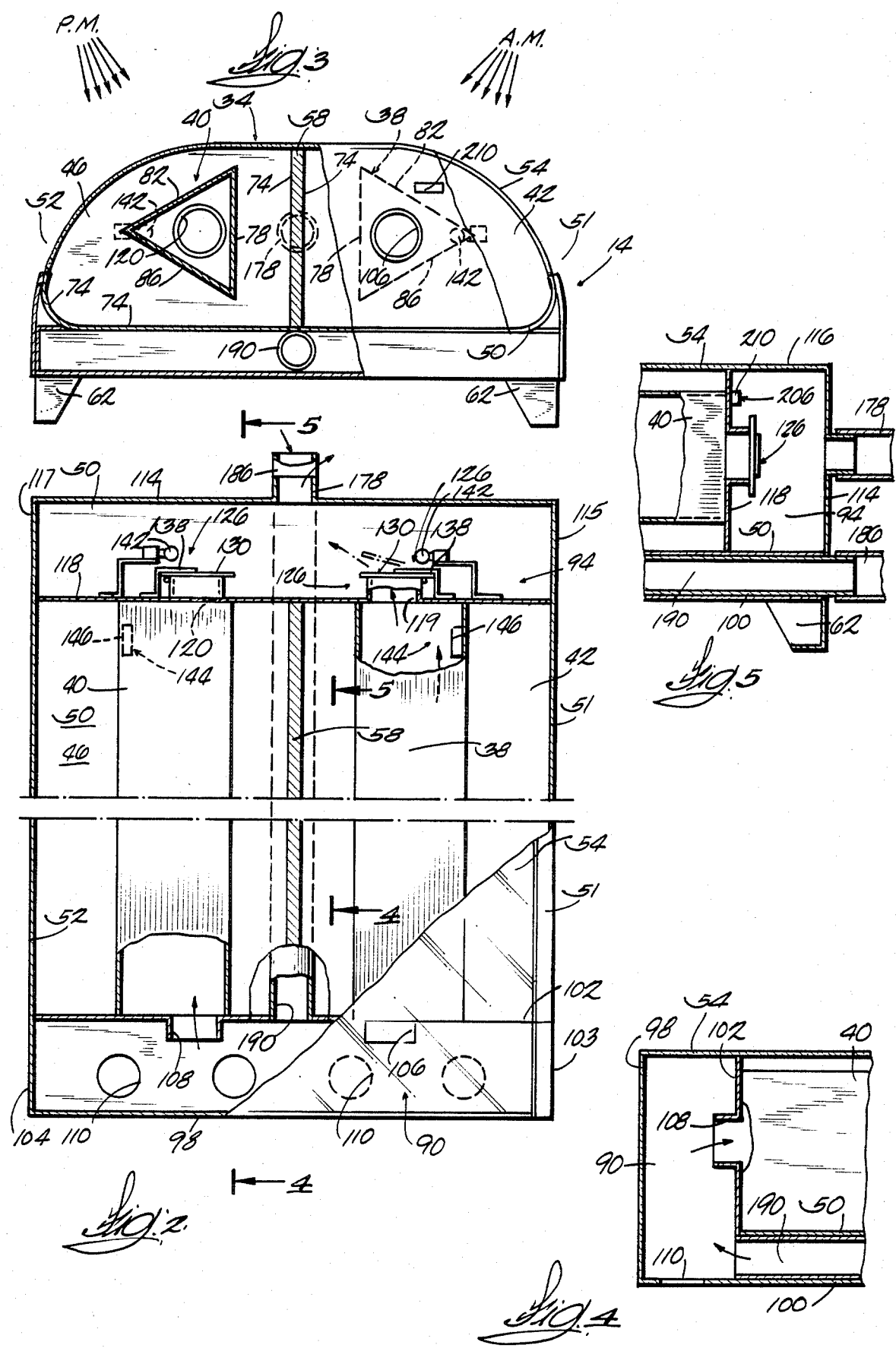

SOLAR HEATING APPARATUS WITH SOLAR HEAT RECEIVING MEANS AND HEAT STORAGE AND DISTRIBUTION MEANS

BACKGROUND OF THE INVENTION

This invention relates to solar heating apparatus including solar heating means for the heating of air passing therethrough and heat storage and distribution means in communication with the solar heating means for storing and utilizing the heated air to heat a room or the like. More particularly, this invention relates to such apparatus including means for circulating air through the heat storage and distribution means when the air from the solar heating means exceeds a predetermined temperature.

U.S. Patents which disclose solar heating apparatus including solar heating means and heat storage and distribution means include:

| Patentee | U.S. Pat. No. | Issued |
| --- | --- | --- |
| Hexdall | 3,060,870 | Oct. 30, 1962 |
| Abhat et al | 4,131,158 | Dec. 26, 1978 |
| Bergen | 4,219,012 | Aug. 26, 1980 |

SUMMARY OF THE INVENTION

One of the principal objects of this invention is to provide a solar heating apparatus which has a simple construction and which is therefore more reliable to use and operate than many current solar heating apparatus.

Another of the principal objects of this invention is to provide such a solar heating apparatus which can effectively utilize solar energy throughout the day without requiring any moving orientation structure.

Another of the principal objects of this invention is to provide a heat storage and distribution means which permits heated air from heat receiving means to heat a room, and a separate and distinct way in which heat stored in the heat storage and distribution means can be utilized to heat a room.

This invention provides a solar heating apparatus including solar heating means for the heating of air passing therethrough, heat storage and distribution means, in communication with air from the solar heating means, for storing and distributing the heated air to heat a room, and means for circulating air through the heat storage and distribution means when the air from the solar heating means exceeds a predetermined temperature.

The solar heating means comprises solar heat receiving means including a plurality of spaced-apart solar heating tubes, an air inlet into the solar heating means, an air outlet out of the solar heating means, and valve means between each of the tubes and the solar heating means outlet for selectively placing each of the solar heating tubes in communication with the solar heating means outlet when the air temperature in the respective solar heating tube is greater than a predetermined temperature.

The heat storage and distribution means includes a heat storage container, a heat storage medium in the container, and means defining an air path through the heat storage cntainer for allowing heated air from the solar heating means to flow in contact with and heat the medium. Such means includes an inlet into the container, the inlet being in communication with heated air from the solar heating means outlet, and a return outlet in the container and in communication with the solar heating means air inlet.

The means for circulating air through the heat storage container comprises means for circulating air in contact with the heat storage medium, and means for energizing the circulating means in response to air temperature in the solar heating means outlet which exceeds a predetermined temperature.

The heat storage and distribution means further includes means defining another air path for circulating external air through the heat storage medium to be heated and distributing the heated air to the room.

BRIEF DESCRIPTION OF THE DRAWINGS

FIG. 1 is a perspective view of a solar heating apparatus which embodies various of the features of the invention.

FIG. 2 is a top view, partially broken away, of the solar collector shown in FIG. 1.

FIG. 3 is an end view, partially broken away, of the solar collector shown in FIG. 1.

FIG. 4 is a cross-sectional view taken along the line 4—4 in FIG. 2.

FIG. 5 is a cross-sectional view taken along the line 5—5 in FIG. 2.

FIG. 6 is a side view, partially broken away, of the heat storage and distribution device shown in FIG. 1.

FIG. 7 is a top view, partially broken away, of the storage and distribution device shown in FIG. 1.

FIG. 8 is an end view, partially broken away, of the heat storage and distribution device shown in FIG. 1.

DESCRIPTION OF THE PREFERRED EMBODIMENT

As illustrated in the drawings and most particularly in FIG. 1, this invention provides a solar heating apparatus 10 including solar heating means 14 for the heating of air passing therethrough, heat storage and distribution means 18 in communication with the solar heating means 14 and for storing and utilizing the heated air to heat a room 22, and means 26 for circulating air through the heat storage and distribution means 18 when the air from the solar heating means 14 exceeds a predetermined temperature.

More particularly, as illustrated in FIGS. 2, 3, 4 and 5, the solar heating means 14 is in the form of an elongated solar collector which includes a plurality of solar heat receiving means 34 comprising two spaced-apart parallel solar heating tubes 38 and 40. Each of the tubes 38 and 40 is enclosed within separate chambers 42 and 46, respectively, formed by a lower base plate 50, side walls 51 and 52, an outer curved transparent covering 54, and an intermediate wall 58 between the two chambers 42 and 46 which extends perpendicularly from the base plate 50 to the transparent cover 54. The parallel tubes 38 and 40 are in the form of hollow, elongated, members having a triangular cross section and formed of an appropriate heat absorbing material, such as aluminum.

As illustrated in FIG. 1, the solar collector 14 also includes supporting means 62 in the form of legs to orient the collector 14 so as to most effectively receive solar energy heating during the winter months of the year. In a preferred orientation, the elongated solar collector 14 extends from north to south and the northern end 66 is raised by the legs 62 so as to be above the southern and 70. In this manner, the incidence of solar energy on the collector 14 during the winter heating months is generally perpendicular to the surface of one side of each of the solar heating tubes 38 and 40.

With the solar collector disposed in this north-south orientation, the solar heating tube 38 is disposed so as to receive solar energy during the A.M. hours, while the other solar heating tube 40 is disposed to receive solar energy during the P.M. hours.

As illustrated in FIG. 3, both vertical surfaces of the intermediate wall 58, the interior surfaces of the side walls 51 and 52 and the upper surface of the base plate 50 include reflective material 74 so that sunlight passing through the cover 54 and missing the solar heating tubes 38 and 40 is reflected back to the appropriate tube by the reflective surfaces 74.

One side 78 of each of the elongated triangular-shaped tubes 38 and 40 is generally parallel to the intermediate wall 58 to receive sunlight reflected from the intermediate wall 58. Another side 82 of each of the triangular-shaped tubes 38 and 40 is oriented to receive sunlight directly during the A.M. or P.M. hours, respectively, and the last side 86 of each triangular-shaped tube extends away from the intermediate wall 58 at about a 45° angle to the base plate 50 to receive sunlight reflected from the base plate 50 and side walls 51 and 52.

The elongated tubes 38 and 40 are coated with a non-reflective material, such as black paint, to maximize absorption of solar energy.

As illustrated in FIGS. 1 and 2, the solar heating tubes 38 and 40 extend between an air inlet chamber 90 at the southern end 70 of the solar collector 14, and a heated air outlet chamber 94 at the northern end 66 of the solar collector 14.

As illustrated in FIGS. 2, 3 and 4 the air inlet chamber 90 is formed by a lower plate 100 extending below and parallel to the base plate 50, a transparent outer end wall 98, a transparent inner wall 102 separating the air inlet chamber 90 from the chambers 42 and 46 around the solar heating tubes 38 and 40, and transparent sidewalls 103 and 104. A portion of the transparent cover 54 on the solar collector 14 completes the air inlet chamber 90.

The air inlet chamber 90 provides a pre-heat chamber for air which passes through openings 106 and 108 into the hollow interior of the solar heating tubes 38 and 40, respectively, as described in more detail below. Fresh make-up air enters the air inlet chamber 90 through small openings 110 provided in the lower plate 100.

As illustrated in FIGS. 2 and 5, the air outlet chamber 94 is formed by an insulating outer end wall 114, the base plate 50, insulating sidewalls 115 and 117, an insulating cover 116, and an insulating inner wall 118 which separates the air outlet chamber 94 from the chambers 42 and 46 around the solar heating tubes 38 and 40. Openings 119 and 120 in the inner wall 118 connect the air outlet chamber 94 with the interior of the solar heating tubes 38 and 40.

As illustrated in FIGS. 2, 3 and 5, the solar collector 14 also includes valve means for selectively placing each of the solar heating tubes 38 and 40 in communicating with the air outlet chamber 94 when the air temperature in the respective solar heating tube is greater than a predetermined temperature. More particularly, such valve means comprises flapper valves 126 for the solar heating tubes 38 and 40, each including a flapper 130 disposed over the respective opening 119 or 120. Each flapper 130 is hinged to the inner wall 118 and is biased towards a closed position by a bi-metallic strip 138 which is arranged to open the flapper 130 in response to being heated.

Each bi-metallic strip 138 is heated to open the corresponding flapper 130 by a small light bulb 142 mounted on the inner wall 118 adjacent each strip 138. Switch means 144 includes a thermostat 146, which senses the air temperature inside each solar heating tube 38 and 40, energizes the light bulb 142 when the air temperature inside the respective solar heating tube exceeds the predetermined temperature. In the preferred embodiment, the respective flapper valve 126 opens when the temperature inside the respective solar heating tube exceeds 110° F.

When the solar collector 14 is heated during the A.M. hours, tube 38 is heated by sunlight until the air temperature in the tube 38 reaches at least 110° F. The flapper valve 126 provided for tube 38 then opens by the thermostat 146 energizing the bulb 102 for tube 38. Air preheated in the inlet chamber 90 then enters the tube 38 and heated air in the tube 38 enters the outlet chamber 94. While the tube 38 is heated during the early A.M. hours, the tube 40 will not be receiving sunlight. Because the flapper valve 126 provided for tube 40 is closed, the cool air in tube 40 will not cool the air in the outlet chamber 94. Near noon, both the solar tubes 38 and 40 can be open in the event the temperature of the air inside each is above 110° F. In the P.M. hours, when the tube 40 is heated by sunlight and tube 38 is cool, the flapper valve 126 is open and the flapper valve 126 is closed.

The heat storage and distribution means 18, as illustrated in FIGS. 1, 6, 7, and 8, comprises a heat storage container 150 with an outer layer of insulation 154. The heat storage and distribution means 18 also includes a heat storage medium 158 in the container 150 and first means 162 defining a path through which the heated air from the solar heating means 14 flows to heat the medium 158.

More particularly, as illustrated in FIG. 6, the heat storage medium 158 comprises a plurality of heat absorbing members in the form of parallel spaced-apart plates 166 mounted in the container 150. The parallel plates 166 enclose an appropriate heat absorbing material 170, such as cement, sand, or salt, which is capable of efficiently absorbing and storing heat from the heated air passing over the outer surface of the plates 166.

The air path through the heat storage and distribution means 18 is defined by an inlet 174 in the container 150 connected in communication by means of a conduit 178 with heated air from the solar collector air outlet chamber 94, and an outlet 182 in the container 150 connected in communication with the solar collector air inlet chamber 90 by a conduit 186 and a passageway 190 (as illustrated in FIGS. 3 and 4) extending through the solar collector 14 between the base plate 50 and the lower plate 100.

As illustrated in FIG. 6, the first path means 162 further includes means, such as baffles 198, for directing the heated air over the heat storage medium. The baffles 198 are disposed adjacent the upper and lower edges of the parallel plates 166 to direct air around each of the parallel plates 166 as heated air passes through the storage container 150 from the inlet 174 to the outlet 182. The plates 166 extend transversely and perpendicularly to the general direction of air flow between the inlet 174 and outlet 182 to promote efficient heating of the plates 166.

As illustrated in FIGS. 1 and 7, the means 26 for circulating air through the heat storage and distribution means 18 includes a primary fan 202 disposed in the conduit 178 between the solar collector air outlet chamber 94 and the first air path storage container inlet 174 for circulating air over and around the parallel plates 166.

As illustrated in FIGS. 3 and 5, switch means 206 including a thermostat 210 is provided for energizing the primary fan 202 in response to an air temperature in the solar collector air outlet chamber 94 which exceeds a predetermined temperature. The thermostat 210 is located in the solar collector air outlet chamber 94 and operably connected to the primary fan 202. In the preferred embodiment, the primary fan 202 is energized when the air temperature in the solar collector air outlet chamber 94 exceeds 120° F. Since the primary fan 202 is only energized when the air in the outlet chamber 94 is above 120° F., it does not introduce unheated or cool air into the heat storage and distribution means 18.

The heat storage and distribution means 18 is arranged to heat the room in two ways. As illustrated in FIGS. 7 and 8, the first way is with heated air directly from the solar collector 14, usually during the daylight hours. This heated air, after passing over and heating the plates 166, can be partially exhausted directly into the room 22 through a closable outlet or register 226 in the front side of the container 150 in communication with the room 22 and in communication with air which passes around the parallel plates 166 along the first air path. The amount of the heated air from the solar collector 14 exhausted into the room 22 for heating can be controlled through manual adjustment of this register 226 (or automatic adjustment in other embodiments). The remaining heated air is recirculated through the conduit 186, through the passageway 190 in the bottom portion of the solar collector 14 and into the air inlet chamber 90 wherein it mixes with and preheats fresh air entering through openings 110.

In an alternate arrangement, illustrated by dashed lines in FIG. 1, a portion of the heated air from the container 150 can be exhausted into an existing forced air heating system or into a duct 254 which directs the heated air to a remote location.

As illustrated in FIGS. 1, 7 and 8, the other way the solar heating and distribution means 18 distributes heated air to heat the room 22 is by second means 218 which circulates internal air through the heat storage medium 158 for heating and then exhausts the thus-heated air into the room 22.

The second means 218 includes an air inlet 222 into the container 150 and in communication with a source of air, such as the air in the room 22, conduits 238 from the inlet 222 which pass through the plates 166 and empty into the container 150, a secondary fan 230 for circulating air through the heat storage medium 158 from the second air path inlet 222 to the container 150, and the register 226.

The second air path inlet 222 is in the form of an inlet manifold which includes a plurality of openings 234 in communication with conduits 238 which pass through each of the heat absorbing plates 166. The inlet manifold 222 also includes an opening 242 through which the secondary fan 230 introduces air from the room 22.

The air is heated as it is circulated through the conduits 238 by the secondary fan 230, and exits into the heat storage container 150 from which it can be distributed into the room 22 through the register 226 as described above.

The solar heating and distribution means 18 is usually used in this second way during the evening hours, after the primary fan 202 has been de-energized because the air temperature in the solar collector air outlet chamber 94 is below the setting of the thermostat 210.

As illustrated in FIGS. 6 and 7, the heat storage and distribution means 18 also includes switch means 258 preventing energizing of the secondary fan 230 unless the air temperature inside the container 150 is above a predetermined air temperature. The switch means 258 comprises a thermostat 262 which is mounted inside the heat storage container 150 to sense the air temperature of the first air path means 162. In the preferred embodiment, the thermostat 262 prevents the secondary fan 230 from being energized unless the air temperature in the heat storage container exceeds about 90° F. A separate room thermostat (not shown) is provided to energize the secondary fan 230 when the air temperature in the room 22 is below a predetermined level. This room thermostat can also be used as part of an automatic control for the register 226.

Thus, when the temperature inside the heat storage container 150 is below the setting of the thermostat 262, the secondary fan 230 will not energize even though the room temperature is below the setting of the room thermostat. This prevents the secondary fan 230 from blowing unheated air into the room 22.

The electrical control circuit (not shown) for the primary fan 202 and the secondary fan 230 is arranged so that the secondary fan 230 can not operate when the primary fan 202 is operating. For example, the control circuit can include a relay (not shown) which is energized in response to the thermostat 210 energizing the primary fan 202 and includes a normally-closed set of contacts (not shown) which open to prevent flow of electrical power to the secondary fan 230. Thus, in the event it becomes cloudy during the day (e.g., during a rain storm) and the primary fan 202 shuts off because the air temperature in the solar collector outlet chamber 94 drops below 120° F., the secondary fan 230 can be turned on for heating. If the sun later starts shining and the air temperature in the outlet chamber 94 increases to 120° F., the primary fan 202 is turned on and the secondary fan 230 is turned off in response to actuation of the thermostat 210.

It is to be understood that the invention is not confined to the particular construction and arrangement of parts herein illustrated and described but embraces all such modified forms thereof as come within the scope of the following claims.

I claim:

1. A solar heating system comprising
   solar heating means for solar heating air flowing therethrough, said solar heating means including
   means defining plurality of separate, elongated heating chambers in side-by-side relationship for receiving solar energy, a separate air inlet chamber adjacent one end of said heating chambers and having an opening for admitting fresh air into said inlet chamber, and a separate air outlet chamber adjacent the opposite end of said heating chambers,
   at least one air heating tube extending through each of said heating chambers with one end communicating with said inlet chamber and the opposite end communicating with said outlet chamber, valve means for each of said heating tubes and movable between open and closed positions to respectively permit and prevent air flow through the respective heating tube, means for moving each of said valve means to the open and closed positions in response to the temperature inside the respective heating tube being respectively above and below a predetermined level; and heat storage and distribution means for storing and distributing heated air to a room including a heat storage container having an inlet communicating with said outlet chamber and a return outlet communicating with said inlet chamber, heat storage medium disposed inside said container, means for defining a first flow path through said container from said inlet to said return outlet for causing heated air from said outlet chamber to pass in contact with and heat said medium, first air circulating means for circulating heated air from said outlet chamber through said first flow path, and means for energizing and de-energizing said first air circulating means in response to the air temperature in said outlet chamber being respectively above and below a predetermined level.

2. A solar heating system according to claim 1 including a heated air opening in said container for admitting heated air from said container into the room.

3. A solar heating system according to claim 1 wherein said heat storage and distribution means includes an ambient air inlet in said container, means defining a second flow path through said container from said ambient air inlet to said heated air outlet for causing air entering through said ambient air inlet to pass in contact with and be heated by said medium, and second air circulating means for circulating ambient air through said second flow path.

4. A solar heating system according to claim 3 wherein said heat storage and distribution means includes means for selectively energizing said second air circulating means only when the temperature inside said container is above a predetermined level and the room temperature is below a predetermined level.

5. A solar heating system according to claim 4 wherein said heat storage and distribution means includes means for preventing said second air circulating means from operating when said first air circulating means is operating.

6. A solar heating system according to claim 3 wherein said heat storage medium includes a plurality of spaced heat absorbing members, each having an outer surface disposed in said first flow path and an internal passageway communicating with said ambient air inlet and with said heated air opening and forming a part of said second flow path.

7. A solar heating system according to claim 6 wherein said heat absorbing members comprise plates including a heat absorbing material and disposed in said first flow path in parallel spaced relationship and generally perpendicularly to the direction of flow through said first flow path.

8. A solar heating system according to claim 1 wherein said heating chambers are generally parallel, at least one of said heating chambers and said heating tubes are disposed for said one heating tube to receive most direct solar rays during A.M. hours, and another of said heating chambers and said heating tubes are disposed for said another heating tube to receive most direct solar rays during P.M. hours.

9. A solar heating system according to claim 1 wherein said heating chambers include means for reflecting solar energy onto said heating tubes.

10. A solar heating system comprising solar heating means for solar heating air flowing therethrough, said solar heating means including means defining plurality of separate, elongated heating chambers in side-by-side relationship for receiving solar energy, a separate air inlet chamber adjacent one end of said heating chambers and having an opening for admitting fresh air into said inlet chamber, and a separate heated air outlet chamber adjacent the opposite end of said heating chambers, at least one air heating tube extending through each of said heating chambers with one end communicating with said inlet chamber and the opposite end communicating with said outlet chamber, valve means for each of said heating tubes and movable between open and closed positions to respectively permit and prevent air flow through the respective heating tube, means for moving each of said valve means to the open and closed positions in response to the temperature inside the respective heating tube being respectively above and below a predetermined level; and heat storage and distribution means for storing and distributing heated air to a room including a heat storage container having an inlet communicating with said outlet chamber, a return outlet communicating with said inlet chamber, an ambient air inlet, and a heated air outlet for admitting heated air from said container into the room, a plurality of spaced heat absorbing members, each having an outer surface disposed in said first flow path and an internal passageway communicating with said ambient air inlet and said heated air opening, means defining a first flow path through said container from said inlet to said return outlet for causing heated air from said outlet chamber to pass in contact with the outer surface of said heat absorbing members, first air circulating means for circulating heated air from said outlet chamber through said first flow path, means for energizing and de-energizing said first air circulating means in response to the air temperature in said outlet chamber being respectively above and below a predetermined level, means defining a second flow path through said container from said ambient air inlet to said heated air outlet for causing air entering through said ambient air inlet to pass through said passageway of said heat absorbing members and be heated by said heat absorbing members, and second air circulating means for circulating ambient air through said second flow path.

11. A solar heating system according to claim 9 wherein said heat storage and distribution means includes means for preventing said second air circulating means from operating when said first air circulating means is operating.

12. A solar heating system comprising solar heating means for solar heating air flowing therethrough, said solar heating means including means defining plurality of separate, elongated heated chambers in side-by-side relationship for receiving solar energy, a separate air inlet chamber adjacent one end of said heating chambers and having an opening for admitting fresh air into said inlet chamber, and a separate heated air outlet chamber adjacent the opposite end of said heating chambers, at least one air heating tube extending through each of said heating chambers with one end communicating with said inlet chamber and the opposite end communicating with said outlet chamber, valve means for each of said heating tubes and movable between open and closed positions to respectively permit and prevent air flow through the respective heating tube, means for moving each of said valve means to the open and closed positions in response to the temperature inside the respective heating tube being respectively above and below a predetermined level; and heat distribution means for distributing heated air to a room including a heat storage container having an inlet communicating with said outlet chamber, a return outlet communicating with said inlet chamber, and a heated air opening for admitting heated air from said container into the room, air circulating means for circulating heated air from said outlet chamber through said first flow path, and means for energizing and de-energizing said air circulating means in response to the air temperature in said outlet chamber being respectively above and below a predetermined level.

* * * * *